United States Patent Office 3,799,942
Patented Mar. 26, 1974

3,799,942
4,5-SUBSTITUTED N-OXY AND HYDROXY HYDROIMIDAZOLES
David G. B. Boocock, Scarborough, Ontario, Canada, Raphael O. Dorchai, Portlaoise, Ireland, and Jeanne H. Osiecki, Los Altos Hills, and Edwin F. Ullman, Atherton, Calif., assignors to Syva Corporation, Palo Alto, Calif.
No Drawing. Continuation-in-part of application Ser. No. 696,718, Jan. 10, 1968, which is a continuation-in-part of application Ser. No. 740,055, June 26, 1968, which in turn is a continuation-in-part of application Ser. No. 752,744, Aug. 15, 1968, all now abandoned. This application Apr. 12, 1971, Ser. No. 133,327
Int. Cl. C09d 49/34
U.S. Cl. 260—309.6          15 Claims

ABSTRACT OF THE DISCLOSURE

Mono and poly-4,4,5,5-tetrasubstituted-1,3-diazoles are provided having at least one nitrogen atom bonded to an oxygen atom. The diazoles are provided in varying states of oxidation. Particularly desirable compounds are those in which one of the oxidants is present as a free radical, the compound being an extremely stable free radical and useful for spin labeling, oxidation inhibition, and free radical chain termination, for example, in polymerizations. By virtue of the excellent stability of the free radicals, the free radical compounds can also be used as standards for calibration of electron spin resonance spectrometers.

CROSS REFERENCES TO RELATED APPLICATIONS

This application is a continuation in part of application Ser. No. 696,718 filed Jan. 10, 1968, now abandoned, Ser. No. 740,055, filed June 26, 1968, and Ser. No. 752,744, filed Aug. 15, 1968, both now abandoned.

BACKGROUND OF THE INVENTION

Field of the invention

Numerous stable free radicals and stable free radical precursors have been reported in the literature. The free radicals have found a wide variety of uses, particularly for use in reactions where free radicals are involved. The stable free radicals act as inhibitors or as detectors of the presence of free radicals.

With electron spin resonance spectrometry, the stable free radical provides a unique probe into the environment and structure of complex molecules. Because the stable free radical is influenced by its physical environment, changes in the electron spin resonance spectrum can be related to the particular environment.

Desirable free radicals are those which are stable to oxygen and also to heat and light and provide relatively simple spectra so that changes can be easily detected and interpreted. Preferably, the stable free radical should be easily synthesized with a variety of functional groups, so as to be readily adapted to specific situations or applications.

Description of the prior art

A thorough discussion of nitroxide radicals may be found in Forrester et al., Organic Chemistry of Stable Free Radicals, Academic Press, London and New York, 1968, chapter 5. A number of publications have issued coauthored by one more of the inventors of the subject invention. See for example, Boocock et al., J. Am. Chem. Soc., 90, 6873 (1968); Kreilick et al., ibid, 91, 5121 (1969); Boocock et al., ibid, 90, 5945 (1968); Osiecki, ibid, 90, 1078 (1968) and Ullman et al., Chem. Comm., 1969, 1161. For use of nitroxide free radicals as spin labels for various naturally occurring materials, see U.S. Pat. Nos. 3,453,288, 3,481,952, and 3,489,522 as well as an article by Hubbell et al., Proc. Nat. Acad. Sci. U.S., 61 12 (1968). For other uses of stable free radical nitroxides, see U.S. Pat. Nos. 3,372,182 and 3,197,508.

SUMMARY OF THE INVENTION

Mono- and poly- (usually di-) 4,4,5,5-tetrasubstituted-1,3-diazoles are provided having at least one nitrogen atom bonded to an oxygen atom, wherein the nitrogen atoms are in various stages of oxidation. Included among these compounds are extremely stable nitroxide free radicals. These free radical compounds are versatile and can be easily prepared from available compounds having a variety of functional groups or the free radical functionality may be present during various chemical transformations, whereby new functional groups are introduced or functional groups are modified. The compounds have a variety of uses, depending on the particular compound, acting as precursors to the free radical compound or as oxidizing reagents, reducing reagents, spin labels, electron spin resonance spectrometer standards and free radical reaction inhibitors.

DETAILED DESCRIPTION

The compounds of this invention are mono- and poly-4,4,5,5-tetrasubstituted-1,3-diazoles, usually di-, having at least one nitrogen atom bonded to an oxygen atom and having from 0 to 1 site of internal ethylenic unsaturation. The groups at the $C_4$ and $C_5$ positions are hydrocarbon of from 1 to 20 carbon atoms, more usually 1 to 12 carbon atoms, while at $C_2$, there may be hydrogen or an organic radical.

For the most part, the compounds of this invention will come within one of the two following formulas:

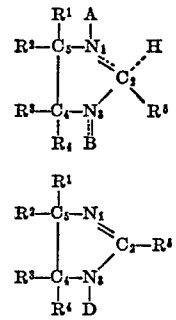

wherein:

$R^5$ is hydrogen or an organic group bonded through a carbon atom to the annular carbon atom;
each of $R^{1-4}$ is a hydrocarbon group of from 1 to 20 carbon atoms, usually of from 1 to 12 carbon atoms and more usually of from 1 to 8 carbon atoms, which may be aliphatically saturated or unsaturated, normally having not more than 1 site of aliphatic unsaturation, and may be alkyl, alkenyl, alkinyl, alicyclic or aryl or combinations thereof; or $R^{1-2}$ and $R^{3-4}$ may be taken together to form a divalent radical, an alkylene or an alkenylene group, each having from about 3 to 10 carbon atoms; or $R^1$ and $R^3$ may be taken together to form a divalent radical of from 3 to 10 carbon atoms to provide a mono- or bicyclic ring with the carbon atoms to which they are attached;
each of the atom pairs $$N_1=C_2$$

and $$N_3 = B$$

is joined by a single or a double bond provided that only when the atom pair $$N_1 = C_2$$

is joined by a single bond, a hydrogen atom is also bonded directly to $C_2$; and A and B are selected from an hydroxyl group or oxygen and hydrogen atoms according to the order of the bond between the atom pairs $$N_1 = C_2$$

and $$N_3 = B$$

as follows:

(1) The atom pairs $$N_1 = C_2$$

and $$N_3 = B$$

are both joined by single bonds: A and B are both hydroxyl groups;

(2) the atom pairs $$N_1 = C_2$$

and $$N_3 = B$$

are both joined by double bonds: A and B are both oxygen atoms;

(3) the atom pair $$N_1 = C_2$$

is joined by a double bond and the atom pair $$N_3 = B$$

is joined by a single bond: A is an oxygen atom and B is selected from oxygen and hydrogen atoms or the hydroxyl group;

(4) and, D is hydroxyl or an oxygen atom (when D is hydroxyl, it may also exist as a tautomer with the hydrogen of the hydroxyl on the $N_1$ nitrogen atom and the double bond between $C_2$ and $N_3$.

The compounds encompassed in the above formulae may be divided into the following individual compounds:

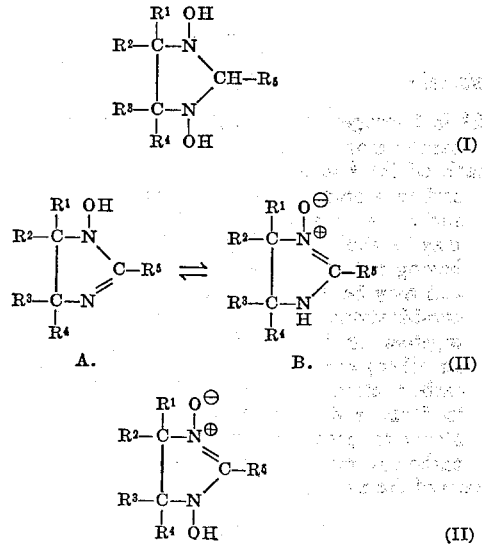

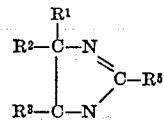

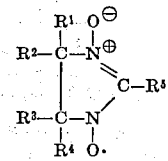

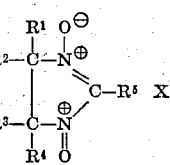

(compounds of Formula VI have a positive charge and therefore have associated with them any suitable anion, e.g., halide, sulfate, nitrate, phosphate, borate, etc.). The molecules are substantially in ascending order of state of oxidation.

$R^5$ can be varied extremely widely and can be hydrogen or an organic radical having a carbon atom bonded to the carbon atom of an aldehyde, carboxylic acid or their derivatives. $R^5$ by virtue of the nature of the compounds involved and their uses, may be bonded to simple organic radicals, complex organic radicals, naturally occurring or synthetic polymers, and to complex cyclic, polycyclic and heterocyclic compounds, both naturally occurring and synthetic. Therefore, any limitations as to the nature of $R^5$ are purely arbitrary in ignoring the compounds which may be prepared employing the diazole ring functionalities of the subject invention. This is particularly true with those compounds which have the nitroxide free radical functionality.

Except where polymers are involved, $R^5$ as an organic radical will normally have a molecular weight in the range of about 15 to 5,000, more usually from about 15 to 3,000. When polymers are involved, such as proteins, polysaccharides, etc. the molecular weight for $R^5$ may vary from 5,000 to 5 million, more usually varying from about 50,000 to 2 million. With most common molecules, the organic radical will have from 1 to 200 carbon atoms, usually from about 1 to 60 carbon atoms, more usually of from 1 to 30 carbon atoms, and have from 0 to 20 heteroatoms, more usually from 0 to 10 heteroatoms, primarily oxygen, nitrogen, sulfur, silicon, boron, phosphorous, and metal cations, e.g. alkali and alkaline earth metal cations, although other metals may be present such as the Group 8 metals, e.g. iron, cobalt and nickel; more usually the heteroatoms will be oxygen, nitrogen, phosphorous and sulfur.

Almost any organic functionality may be present with one or both of the stable free radicals. Oxygen and nitrogen containing functionalities include, oxy-alcohols, phenols and ethers; oxocarbonyl-aldehydes, ketones and derivatives thereof, e.g. nitrogen derivatives such as imino, hydrazone, etc.; nonoxocarbonyl-anhydrides, carboxylic acids, esters, amides and nitrogen derivatives thereof, such as imino esters, amidines, hydroxamic acids, guanidines, etc.; amines—primary, secondary and tertiary; ammonium salts, nitro, cyano, hydrazo, azo, azido, azoxy, nitrate, nitrite, as well as combinations and modifications thereof.

Functionalities including heteroatoms other than oxygen and nitrogen include those functionalities based on sulfur:thioxy, dithio, sulfoxy, sulfone, sulfite, sulfate, sulfonate, sulfonamide, their esters and salts and sulfur halides; based on halogen: fluorine, chlorine, bromine, iodine, iodoso, and haloamine; based on phosphorous: phosphate, phosphonate, thioanalogs, esters and salts;

based on boron: such as borates, boronic acids, their esters and salts; and based on heavy metals, such as metallocenes—ferrocene and cobaltocene; halomercurials, and their derivatives and substituted compounds.

Illustrative $R^5$ groups are:

| | |
|---|---|
| H | $ICH_2$ |
| $Br_3C$ | $\phi C \equiv C$ |
| $\phi CO_2$ | $CH_3(CH_2)_{12}$ |
| $CH_3CH(OH)CH_2$ | Cyclopropyl |
| $C_3H_7O_2C$ | $HOCH_2$ |
| $\phi NHCO$ | $(E+O)_2CHCH_2$ |
| 2-pyridyl | $HO_2CCH(NH_2)CH_2$ |
| 2-pyrrolyl | $\phi CHBr$ |
| 3-indolyl | $(E+O)_2CH$ |
| $BrCH_2$ | $NC\phi$ |
| $ClCH_2$ | |

$(CH_3)_2N\phi$
$NO_2\phi CH=CH$
Cyclopentadienylmethyl
$CF_3$
$(CH_3)_2CH$
$-CH_2CH_2-$
Phenylene
Ferrocenyl
3-cinnolinyl
Bicyclohept-5-enyl
$HOCH_2(CHOH)_4$
$HOCH_2(COOH)_3CNNH_2$
$CH_3CH=C(CH_3)CH_2CH_2CH=C(CH_3)$

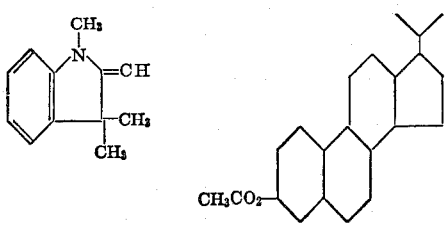

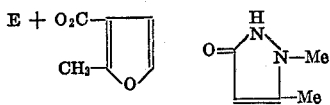

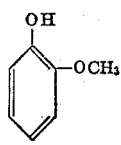

$MeSO_2CH_2CH_2$
Thienyl
1,1-dioxytetrahydrothienyl
2-pyranyl
5-decentyltetrahydrofuranyl (Me-methyl; Et-ethyl; $\phi$-phenyl)

Of course, the above list is not intended to be exhaustive, but rather indicative of the wide variety of groups which may be used in the preparation of the diazole ring and therefore present in the final compound. In addition, the diazole ring may be present, while $R^5$ undergoes a wide variety of modifications or reactions where other functional groups are introduced such as by phosphorylation, sulfation, hydrolysis, displacement, condensation, etc. These types of reactions include displacement of one halogen with another halogen or a hydrocarbyloxy or hydrocarbylamino group, amidification and esterification, both with with organic and inorganic acids, oxidation and reduction, etc. (Hydrocarbyl is a monovalent organic radical composed solely of carbon and hydrogen.)

The diazole rings may be joined so as to have a bridge between the two $C_2$ carbon atoms to provide compounds of the formula:

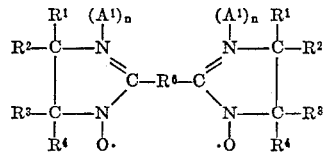

(the radical compounds are illustrative of the diazole compounds in their various oxidation states) wherein $n$ is 0 or 1, the nitrogen to which $A^1$ is attached being positive when $n$ is 1, $A^1$ is oxy ($-O^\ominus$), $R^{1-4}$ have been defined previously and $R^6$ is a bond or divalent radical having from 1 to 30 atoms, usually 1 to 12 atoms other than hydrogen, from 0 to 24 carbon atoms, more usually from 1 to 12 carbon atoms, and from 0 to 8, more usually from 0 to 7 heteroatoms usually oxygen, nitrogen and sulfur.

$R^6$ may be aliphatic, alicyclic, aromatic, heterocyclic or combinations thereof, and may be aliphatically saturated or unsaturated, usually having from 0 to 2 sites of aliphatic unsaturation. The heterofunctionalities that may be present are oxy—alcohols, phenols and ethers; nonoxocarbonyl—carboxylic acid and salts, esters and amides; oxocarbonyl—ketones and aldehydes; amine, mercapto, thioether, sulfoxy and sulfones.

Where a polydiazole is prepared, for example by substitution on a polymer having a plurality of functional groups, there may be from about 2 to 700 diazole rings, more usually 2 to 20 diazole rings per polymer, preferably 2 to 10 diazole rings. The recurring functional unit in the polymer may be a carboxamide, carboxylate ester, an ether, amine, etc. The diazole may be linked to the polymer by any convenient functionality, e.g. carboxy ester, amide, ether, urea, thiourea, etc.

The preferred compounds of this invention have the following formulae:

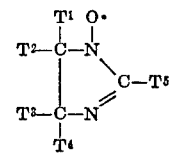

and

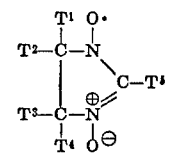

wherein $T^{1-4}$ are hydrocarbon of from 1 to 12 carbon atoms, having from 0 to 1 site of aliphatic unsaturation and preferably free of aliphatic unsaturation. $T^{1-4}$ may be the same or different, preferably with $T^1$ the same as $T^3$ and $T^2$ the same as $T^4$. The total number of carbon atoms of $T^{1-4}$ will usually be in the range of 4 to 28, more usually in the range of 4 to 12 and preferably in the range of 4 to 8. $T^{1-4}$ may be aliphatic, alicyclic or aromatic or combinations thereof, e.g. aralkyl or alkaryl, but is preferably alkyl of from 1 to 3 carbon atoms.

Two of $T^{1-4}$, i.e., $T^1$ and $T^2$, $T^3$ and $T^4$, and $T^1$ and $T^3$, may be taken together with the carbon atoms or atoms to which they are attached to form a ring, which is spiro or fused to the diazole ring, having from 0 to 1 site of ethylenic unsaturation. The ring will normally have from 5 to 7 annular members, there being a total of from 3 to 10 carbon atoms in the divalent radical. When $T^1$ and $T^3$ are taken together there can be from one to two bridges so as to form a mono- or bicyclic ring with the carbon atoms of the diazole ring.

T⁵ is hydrogen or a monovalent organic radical, bonded through a carbon atom to the annular carbon atom, of from 1 to 100 carbon atoms, more usually 1 to 60, preferably 2 to 30 carbon atoms, and from 0 to 20 heteroatoms, usually from 1 to 12 heteroatoms, and preferably of from 1 to 10 heteroatoms.

T⁵ may be aliphatic, alicyclic, aromatic, heterocyclic and combinations thereof, and aliphatically saturated or unsaturated, usually from 0 to 4 sites of aliphatic unsaturation i.e., ethylenic and acetylenic.

Of the heteroatoms there may be from 0 to 8, more usually from 0 to 6 oxygen atoms, from 0 to 8, more usually from 0 to 6 nitrogen atoms and from 0 to 3, usually 0 to 2, each of sulfur, phosphorous, alkali and alkaline earth metal cations, halogen and boron for a total of other heteroatoms of from 0 to 6.

The oxygen heteroatoms will usually be present as oxy, oxocarbonyl, nonoxocarbonyl, as a heteroannular member, or in combination with another heteroatom. The nitrogen heteroatoms may be present as amino—primary, secondary and tertiary—azo, azido, as a heteroannular member, or in combination with another heteroatom.

Combinations of nitrogen and oxygen may be present as carboxamide, hydroxylamino, nitro, isocyanate, and cyano.

Other functionalities embracing one or more heteroatoms include thiooxy, dithio, sulfoxy, sulfonate, sulfonic acid, sulfate, sulfonamide, boronic acid, borinic acid, phosphate, phosphonate, phosphoric acid, halogen, isothiocyanate and ammonium salts.

Preferred is a total of from 1 to 10 heteroatoms, having a total of from 1 to 6 oxygen and nitrogen atoms and from 0 to 4 of the other heteroatoms. The preferred functionalities are the amines, hydroxy, ethers, cyano, organic and inorganic acids, their esters, amides and salts, ammonium salts and halogen, particularly, chlorine, bromine and iodine (atomic No. 17 to 53). The salts will usually be ammonium of from 0 to 20 carbon atoms or the alkali and alkaline earth metal cations.

The compounds of the above formulae will have at least 3 heteroatoms (oxygen or nitrogen), 4 heteroatoms with the α-nitronylnitroxide, usually up to 20 heteroatoms, preferably from 3 to 15 heteroatoms and particularly preferred at least 4 or 5 depending on the free radical functionality and not more than 15. That is, the particularly preferred T⁵ groups will have at least one heteroatom. The total number of carbon atoms in the molecule will be at least 7 and usually not more than 107, preferably from 7 to 60 carbon atoms.

When heterocyclic rings are present, they will normally have from 3 to 10 annular members, more usually 5 to 7 annular members and from 1 to 4, more usually 1 to 3, heteroannular members, particularly nitrogen, oxygen and sulfur.

Illustrative compounds which may be used as stable free radicals are as follows:

2-cyclohexyl-4,4,5,5-tetraphenyl-1,3-dioxyimidazoline,
2-cyclopentadienyl-4,4,5,5-tetraethyl-1,3-dioxyimidazoline,
2-(1',2',3',4'-tetrahydroxybutyl)-4,4,5,5-tetrabenzyl-1,3-dioxyimidazoline,
2-(p-aminobenzyl)-4,5-dipropyl-4,5-diphenyl-1,3-dioxyimidazoline,
2-(acetonyl)-4,5-diethyl-4,5-dimethyl-1,3-dioxyimidazoline,
2-(2'-phenylsulfonylethyl)-4,4,5,5-tetracyclohexyl-1,3-dioxyimidazoline,
2-(p-phenoxybenzyl)-3a,7a-dimethyl-1,3-dioxyhexahydrobenzimidazoline,
2-trimethylsilyl methyl-4,4,5,5-tetraethyl-1,3-dioxyimidazoline,
disodio 2-(2'-hydroxyethyl)-4,4,5,5-tetramethyl-1,3-dioxyimidazoline, phosphate,
2-(p-dihydroxyborophenyl)-4,4,5,5-tetramethyl-1,3-dioxyimidazoline,
2'-(2-pyridyl)-4,4,5,5-tetra(tert.-butylphenyl)-1,3-dioxyimidazoline,
2-[2-(2',4'H-1',3'-dithianaphthalenyl)-4,5-di(1''-naphthyl)-4,5-dimethyl-1,3-dioxyimidazoline,
2-(1'-phenazinyl)-4,4,5,5-tetracyclopentyl-1,3-dioxyimidazoline,
2-(4'-nitrobutyl)-4,4,5,5-tetramethyl-1-oxylimidazolidine,
2-(p-isocyanatophenyl)-4,4,5,5-tetratolyl-1-oxylimidazolidine,
2-(2',2'-diphenoxycarbonylethyl)-4,5-diethyl-4,5-diphenyl-1-oxylimidazoline,
2-(p-carbamoylphenyl)-4,4,5,5-tetramethyl-1-oxylimidazoline,
2-(p-trimethylammoniumphenyl)-4,4,5,5-tetramethyl-1-oxylimidazoline, nitrate,
2-(2'-oxiranyl)-4,4,5,5-tetramethyl-1-oxylimidazoline,
2-(2'-aziridinyl)-4,4,5,5-tetramethyl-1-oxylimidazoline,
1,4-bis[2'-(4',4',5',5'-tetraphenyl-1',3'-dioxyimidazolinyl)]benzene,
1,5-bis[2'-(4',4',5',5'-tetrabenzyl-1',3'-dioxyimidazoline)]naphthalene,
1,10-bis[2'-(4',4',5',5'-tetramethyl-1',3'-dioxyimidazolinyl)]decane,
bis(2-(4,4,5,5-tetramethyl)-1,3-dioxyimidazolinyl) methyl)amine,
and
bis[2-(2'-4,4,5,5-tetramethyl)-1,3-dioxyimidazolinyl) ethyl)]succinate.

As already shown, there may be a wide variety of groups bonded at the 2, 4 and 5 positions of the diazole ring. Therefore, not only is there a great variation in the oxidation state of the molecule, but there is also a great variation in the radicals bonded to the ring nucleus. In effect, the subject invention is concerned with a totally new functionality having a unique structure which provides an extremely stable free radical as well as an extremely potent oxidizing agent.

The basis for the stability of the free radical is derived from the possibility of resonance, supported by the rigid planar structure of the 5 membered ring. While the compounds are written as if the unpaired electron resides on the oxygen, in fact, the unpaired electron may be partially found on any of the atoms involved in the functionality. That is, considering the two functionalities as follows:

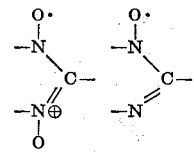

the unpaired electron acts, as if it is present not only on the oxygen atom to which it is indicated as being attached, but the two nitrogen atoms, the carbon intermediate the two nitrogen atoms and the oxygen in the nitronyl functionality. In effect then, groups bonded to the two carbon atoms do affect the electron spin resonance spectrum as being bonded to an atom having unpaired electron density. A few resonance or canonical structures will suffice to illustrate what is meant.

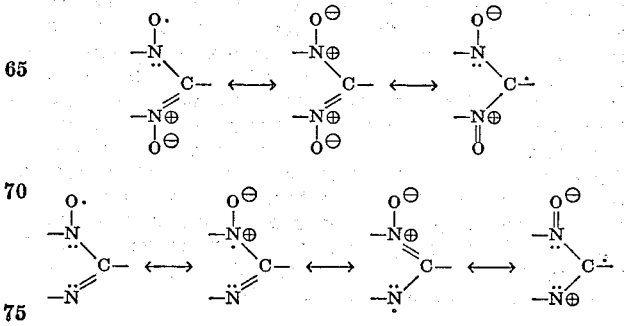

Thus, one not only obtains a stable free radical, but great versatility in modifying the groups bonded to the stable free radical which affect the electron spin resonance spectrum of the unpaired electron.

Turning now to a consideration of the preparation of the subject compounds, the following flow chart indicates the synthetic relationships of the diazole rings. ([O] indicates that the diazole underwent an overall oxidation; [H] indicates that the diazole underwent an overall reduction. The superscript indicates the particular reaction.)

Illustrative bishydroxylamines which find use are 2,3-dihydroxylamino-2,3-dimethylbutane;
2,3-diphenyl-2,3-dihydroxylaminobutane;
3,4-ditolyl-3,4-dihydroxylaminohexane;
bis-1,1(1-hydroxylaminocyclohexane);
1,2-dimethyl-1,2-dihydroxylaminocyclohexane;
tetrabutyl-1,2-dihydroxylaminoethane,
tetrabenzyl-1,2-dihydroxylaminoethane;
2,3-dimethyl-2,3-dihydroxylaminodecane and
2,3-dimethyl-2,3-dihydroxylamino-tetradecane.

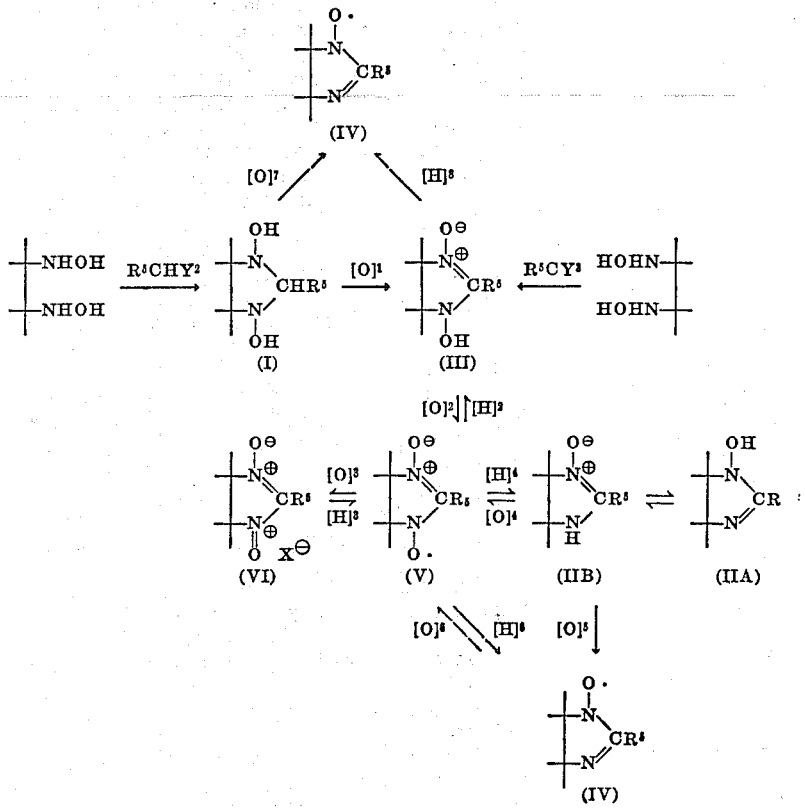

Before discussing the various oxidations and reductions, consideration will be given to the compounds employed which are used to form the diazole ring, namely, the bishydroxylamine and the aldehyde, carboxylic acid or derivatives thereof.

The first compound to be considered is the bishydroxylamine. This bishydroxylamine has the formula:

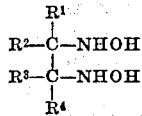

While $R^{1-4}$ may each be different, it is preferred, usually because of the ease of synthesis, that there be a plane or point of symmetry between the carbon atoms bonded to the hydroxylamino groups. That is, $R^{1-2}$ will be the same as $R^{3-4}$.

The bishydroxylamino compounds will normally have at least 6 carbon atoms and usually not greater than 60 carbon atoms, preferably having from about 6 to 30 carbon atoms.

$R^{1-4}$ may be illustrated by methyl, ethyl, propyl, allyl, hexyl, decyl, dodecyl, 2-hexenyl, propynyl, 2-cyclohexenyl-1, cyclopentyl, 2,5-cyclohexadienyl-1, phenyl, tolyl, α-cumyl, p-tert.-butyl benzyl, etc.

When two of the R groups are taken together they may be illustrated by propylene, butylene, propenylene, butenylene, pentylene, cyclopentylene, etc.

To provide the 4,4,5,5-tetrasubstituted-1,3-dihydroxy diazole, an aldehyde or aldehyde derivative is employed. The aldehydes which find use have the following formula:

wherein $R^5$ has been previously described and the two Y's may be taken together to form an oxygen doubly bonded to carbon (the aldehydro function) or may be halogen (chlorine, bromine or iodine; only one Y may be fluorine) hydroxy, hydrocarbyloxy of from 1 to 12 carbon atoms, acyloxy of from 1 to 12 carbon atoms, amino, hydrocarbylamino and dihydrocarbylamino, the hydrocarbyl groups being of from 1 to 12 carbon atoms, mercapto, hydrocarbylthiooxy, the hydrocarbyl group being of from 1 to 12 carbon atoms, cyano, etc.

Disubstituted carbon atoms which react analogously to aldehydes are well known and well characterized in the literature. The salient feature of the disubstituted compound is that it reacts in an analogous manner to the aldehyde, so as to form the diazole ring. Other functionalities, than those indicated above, may also be used, which will provide the same result, e.g. vinyl ethers and esters. The two Y groups which are bonded to the carbon may be the same or different and are most conveniently the same. The preferable groups are when the two Y groups are taken together to form an oxygen doubly bonded to the carbon or are halogen, hydrocarbyloxy, hydrocarbylthiooxy, hydroxy or mercapto.

The carboxylic acid or carboxylic acid derivative will have the following formula:

$$R^5CY_3$$

where Y is as defined above.

The reaction between the bishydroxylamine and the aldehyde, or aldehyde derivative is readily carried out under mild conditions, normally in an inert solvent. The solvent will usually be an aromatic hydrocarbon, a halohydrocarbon, an alkanol or an ether. Illustrative solvents are benzene, chlorobenzene, ethanol, methanol, etc. Other solvents may also be used, as found expedient. Reactions of hydroxylamines with aldehydes and their derivatives are well known, and the various solvents, and reagents are disclosed in the chemical literature.

The reaction temperature will normally be at least about 35° C. and usually not exceed 100° C. The reaction may be carried out in a relatively neutral medium or may be acid catalyzed, depending upon the particular derivative employed. Where a strong acid is produced, as when Y is halogen, a mild base will be employed, such as sodium carbonate, potassium carbonate, pyridine, triethylamine, etc. If convenient, when water is formed as a product, the water may be continuously removed from the reaction mixture, so as to drive the reaction to completion.

The use of carboxylic acids and their derivatives is somewhat more restricted than the use of aldehydes although analogous conditions are employed. With carboxylic acids, only the acyl halide or anhydride will be used and, usually, the group attached to the carbonyl functionality will have one or more, preferably 2 to 3 electron withdrawing substituents, such as halo, halohydrocarbon, acyl, nitro, cyano, etc.

Alternatively, orthoesters or their analogs may be used, having substantially the same functional groups indicated for the acetal derivatives. Preferably, the group will be hydrocarbyloxy or hydrocarbylthiooxy.

In the reaction with the acyl halide or anhydride, the bishydroxylamine is dispersed in an inert solvent, containing a base which will not form a nonreactive product with the acyl compound, such as a tertiary amine, e.g. pyridine, picolinyl, triethylamine, a metal carbonate, etc. The reaction is carried out under mild conditions, e.g. ambient temperatures to 110° C. with agitation, with approximately stoichiometric amounts of the bishydroxylamine and acyl compound. The amine will usually be used in large excess (2 to 10 equivalents). The product is oxygen sensitive and is normally oxidized by air, the solution developing a deep color. When no further reaction appears to be occurring the product is then isolated.

The ortho derivatives are combined with the bishydroxylamine in an inert solvent, preferably an aromatic hydrocarbon or a polar solvent, e.g. ethers, such as tetrahydrofuran and glyme, etc., and in the presence of acid, normally a strong acid, such as benzene sulfonic acid, trifluoroacetic acid, methanesulfonic acid, etc. Stoichiometric amounts of the bishydroxylamine and ortho compound are employed and preferably equivalent amounts of the acid. The reaction will usually require a few minutes, 60 minutes, to as long as ten hours and is carried out at elevated temperatures, usually 50° to 100° C. As in the previous example, the product is oxygen sensitive and will be oxidized to the radical while in solution and may then be isolated. If the oxidation to the radical is not desired, by carrying out the reactions in the absence of oxygen, the 1-hydoxy-3-oxyimidazoline compounds may be obtained.

The various reactions of the diazole compounds will now be considered. Reaction 1 involves the oxidation of the 1,3-dihydroxydazolidine (I) to the 1-hydroxy-3-oxyimidazoline (III). Depending on the oxidant used, the Compound III need not be isolated, but the oxidation of reaction 2 may be carried out simultaneously, so that the product which is obtained is the 1,3 - dioxyimidazoline (V).

Reaction 1 is readily carried out by oxidation with a mild oxidant for relatively short periods of time. Since Compound III is very susceptible to oxidation, it frequently will not be isolated but the reaction allowed to proceed to the nitroxide radical V. In carrying out the reaction from I to III, metal oxide oxidizing agents, such as lead dioxide and manganese dioxide may be used, oxides of halogen may be used, such as periodate, etc. The reaction is carried out conveniently in an inert solvent, preferably in an inert aromatic solvent, at a temperature ranging from about 10° C. to about 30° C.

If Compound III is to be oxidized to Compound V, reaction 2, the same oxidants indicated above may be employed, not interrupting the reaction at the stage of Compound III, and, in addition a large variety of relatively mild oxidizing agents may also be employed. These oxidizing agents include the simple nitroxides such as Fremy's salt, di-tert. butylnitroxide, and other oxidants such as the halogens—iodine, bromine and chloride—oxygen, hypohalides, etc. The oxidation of Compound III to Compound V is carried out substantially in the same manner as that provided for reaction 1 in providing the oxidation of Compounds I, although somewhat more elevated temperatures may be used, temperatures as high as about 50° C.

The total concentrations of reactants may be varied widely, being from 1 weight percent to 50 weight percent of the solution. The concentration is one of procedural convenience, although preferably concentrations in the lower range, from about 1 to 20 weight percent are preferred. Usually, the oxidant will be present in stoichiometric amounts, preferably in from 10 to 50 equivalent percent excess.

The reverse reaction, for Compounds V being reduced to Compounds III, is readily carried out with strong reducing agents. Either chemical or electrochemical reductions can be employed. Conveniently, nascent metals may be used, such as dissolving sodium, potassium, or lithium in a hydroxylic or ammonia or ammonia derivative medium.

The 1,3-dioxyimidazoline may be further oxidized to the 1-oxy-imidazolidine-3-one (VI), reaction 3, by chlorine, a source of chlorine such as sulfuryl chloride, or by oxygen in the presence of a strong acid. Compound VI is readily reduced by a variety of very mild reductants, such as iodide or bromide, aqueous alkali, etc.

Turning now to a consideration of the formation of the diazole compounds having only a single oxygen nitrogen bond in the basic ring structure. The first reaction is reaction 4, whereby the nitronyl nitroxide Compound V is reduced to the nitronyl Compound II. This reaction can be readily carried out in an alkanol, such as ethanol with a strong acid, for example, a mineral acid, such as hydrochloric acid. The reaction is carried out at elevated temperatures, normally in the range of about 40° to 100° C. The nitronyl Compound II can then be readily oxidized back to the nitronyl nitroxide by the use of hydrogen peroxide and phosphotungistic acid.

In carrying out reaction 5, the formation of the nitroxide Compound IV from the nitronyl Compound II, various oxidizing agents, such as those previously described for the oxidation of the nitronylhydroxylamino Compound III may be employed to transform the iminohydroxylamino Compound II to the α-iminonitroxide (IV). Particularly, the metal oxides such as lead dioxide and manganese dioxide find use.

The formation of the iminonitroxide (IV) can be achieved from the nitronyl nitroxide Compound V, the dihydroxylamino Compound I as well as the nitronylhydroxylamino Compound III. Various reagents may be employed which are able to act both in an oxidizing and reducing capacity, so as to provide the iminonitroxide, either from compounds at a lower or higher oxidation state. The reaction is carried out in an acidic medium and in a polar solvent such as dimethylformamide (DMF) acetonitrile, methyl alcohol, water or the like. Various acids may be used, both mineral and carboxylic, such as acetic acid, propionic acid, hydrochloric acid, sulfuric acid or trifluoroacetic acid.

The reagents for providing the reduction or oxidation are exemplified by alkali metal nitrites and lead dioxide.

A method unique to the transformation of the nitronyl nitroxide (V) to the iminonitroxide (IV) in carrying out the transformation of reaction 6 is the use of a phosphine, phosphite, phosphonite, or phosphinite (trivalent phosphorous bonded solely to hydrogen, carbon or oxygen). The phosphorous compounds usually will be within the following formula:

$$P(O_nR)_3$$

wherein $n$ is 0 or 1.

Since the various radicals bonded to the phosphorous do not enter into the reaction, any convenient hydrocarbon group of from 1 to 20 carbon atoms, more usually of from 1 to 12 carbon atoms may be bonded to the phosphorous. The reaction is carried out in a suitable solvent, such as chloroform, tetrahydrofuran, benzene or acetonitrile.

In carrying out the transformations to the iminonitroxide (IV), mild temperatures may be used, normally in the range of about —20° to 100° C. The time may vary from a few minutes to several hours. The concentrations may vary, wherein the reactants form from about 1 to 50 weight percent of the reaction mixture. Normally, the phosphorous compound will be used in stoichiometric amounts or in mild excess. As for the other reagents, they may be used in stoichiometric amounts, but will preferably be used in excess, sometimes in as high as 50 to 100 molar excess.

The compounds which are difunctional, having 2 diazole rings, can be prepared directly from difunctional carboxylic acid derivatives or difunctional aldehydes or aldehyde derivatives or can be linked through a functional group present on the substituent at the 2 position. By this method, amines, esters, ethers, amides, thioethers, sulfones, etc. can be present in the divalent linking group. For the most part, the linking group will either be a single bond or a divalent organic radical having from 1 to 20 carbon atoms and from 0 to 6 heteroatoms, usually oxygen, nitrogen, or sulfur, preferably oxygen and nitrogen.

The following examples provide a variety of preparations of the various compounds, using different reagents, as well as reactants, and in many examples modifying the substituents bonded to groups bonded to the 2 position.

EXAMPLES

The following examples indicate the broad spectrum of compounds which may be prepared as α-nitronyl nitroxide radicals or α-imino nitroxide radicals. The first group of reactions are the preparation of exemplary 1,1,2,2-tetrasubstituted bis - 1,2 - hydroxylaminoethane compounds:

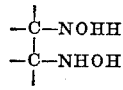

The second group of examples illustrate the preparation of the 1,3-dihydroxy-4,4,5,5 - tetrasubstituted - 1,3-diazoles:

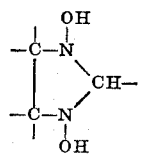   (I)

which are then converted to the 1-hydroxy-3-oxy-4,4,5,5-tetrasubstitutedimidazoline:

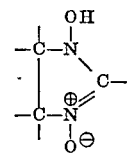   (III)

Rather than stopping at the above compound, the reaction may be carried out so as to directly prepare the radical compound, 1,3-dioxy - 4,4,5,5 - tetrasubstitutedimidazoline or 1-oxyl-3 - oxy - 4,4,5,5 - tetrasubstitutedimidazoline:

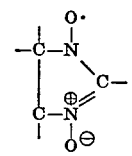   (V)

Alternatively, the 1-hydroxy-3-oxy compound may be prepared from the reaction of the bis-1,2-hydroxylaminoethane with a carboxylic acid.

The third group of preparations is the oxidation of the 1,3-dioxy compound to the 1-one-3-oxy - 4,4,5,5 - tetrasubstitutedimidazoline:

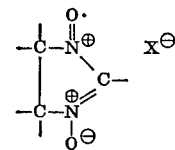   (VI)

The fourth group of reactions involves the conversion of any of the above compounds either directly or indirectly to the 1-oxyl-4,4,5,5-tetrasubstitutedimidazoline:

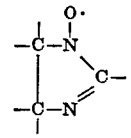   (IV)

or from the 1-hydroxy-4,4,5,5-tetrasubstitutedimidazoline (3-oxy-4,4,5,5-tetrasubstitutedimidazoline):

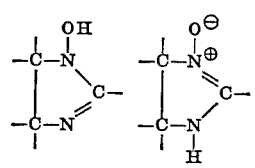   (II)

Finally, the last group of reactions are various conversions of the functionality bonded to the diazole or imidazolidine ring.

(All temperatures are reported in centigrade. TMI stands for 4,4,5,5-tetramethylimidazoline).

GROUP 1

1.1 N,N'-dihydroxy-2,3-diamino-2,3-dimethylbutane.
1.2 1,2-dibenzyl-1,2-dimethyl-1,2-dihydroxylaminoethane.
1.3 5,6-dihydroxylamino-5,6-dimethylbicyclo[2.2.1]-2-heptene.

1.1a.—A mixture of 6 N sodium hydroxide (675 ml.) and 356 g. of 2-nitropropane (4 moles) was stirred and cooled while 320 g. of bromine (2 moles) was added dropwise. Then ethanol was added and the solution refluxed gently (3 hours) before being mixed with ice water (1.5 litres). The crystalline product was washed throughly with 50% ethanol: yield 280 g., M.P. 213–215° C. (lit. 215°).

(b) 2,3-dimethyl-2,3-dinitrobutane (175 g., 1 mole) was stirred in suspension in a solution of ammonium chloride (100 g., 1.9 moles) in 50% aqueous ethanol (2 liters) and kept below 15° while zinc dust (400 g., 6.2 moles) was added during 3 hrs. The reaction mixture was allowed to come to room temperature and stirred overnight. After filtration, the combined filtrate and washings were acidified to pH 2 (150 ml. hydrochloric acid) and evaporated under reduced pressure to a viscous state. Anhydrous potassium carbonate (1 kilogram) was stirred in while cooling, and the resulting powder extracted continuously with chloroform (2.5 litres) overnight. The chloroform extract was dried over anhydrous sodium carbonate, and evaporated to a viscous oil. Petroleum ether was added to promote crystallization of the product (40 g.), M.P. 162–163° (lit. 157–159°).

(c) Preparation of the above dinitro compounds is reported by L. W. Seigle and H. B. Hass in Journal Organic Chemistry, volume 5 (1940), p. 100. In this work the authors report the synthesis of a variety of dinitro compounds including those in which $R_1$, $R_2$, $R_3$ and $R_4$ are alkyl groups, aryl groups and asymmetrical combinations including the following:

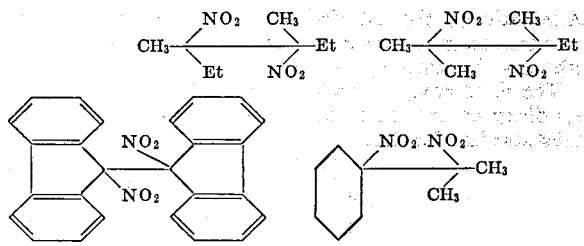

In those situations where a product is desired in which $R_1$ is the same as $R_3$ and $R_2$ is the same as $R_4$, a synthesis in accordance with Sayre: JACS 77, 6689 (1955) is preferably followed.

1.3a.—2,3-dinitro-2-butene (0.024 mol, 3.5 g.), glacial acetic acid (25 ml.), and hydroquinone (10 mg.) were mixed at room temperature. Freshly cracked cyclopentadiene (0.05 mol, 3.3 g., 4.1 ml.) was added, and the system flushed with nitrogen. Under a positive nitrogen pressure, the solution was heated to 60° C. Heating and stirring were continued at this temperature for 20 hours. During this period, the solution turned dark brown in color, and a brown substance was deposited on the walls of the condenser.

The solution was cooled to room temperature and then poured slowly, with continuous stirring, into cold aqueous sodium carbonate (19 g. $Na_2CO_3$—150 ml. $H_2O$). A black tar formed on the surface. Methanol (150 ml.), 1N NaOH (50 ml.), and 5 g. of KOH were added to destroy any unreacted 2,3-dinitro-2-butene and stirring was continued for 5 hrs. The black solution was extracted with three 150 ml. portions of methylene chloride. The combined extracts were washed with 150 ml. of saturated $NH_4Cl$, dried ($MgSO_4$) and concentrated in vacuo to give a brown semi-solid (1.67 g.). Recrystallization from 50 ml. of EtOH/50 ml. of water afforded 0.61 g. of a light brown crystalline material.

(b) The 5,6-dinitro-5,6 - dimethyl-bicyclo-[2.2.1] -2-heptene (0.00047 mol, 0.100 g.) was dissolved in 15 ml. of ethanol. Water (10 ml.) was added and enough $NH_4Cl$ to saturate the solution. This solution was then cooled to 15°. Zinc dust (7× excess, 0.0033 mol), 0.216 g. was added in portions over a 1 min. period. The reaction mixture was allowed to warm to room temperature with stirring for an additional 0.5 hour. The mixture was filtered through Celite and washed with ethanol-water (3:2).

GROUP 2

2.1 1,3-dioxy-2-benzyl-TMI
2.2 1,3-dioxy-2-phenyl-TMI
2.3 1,3-dioxy-2-phenyl-TMI and 1-hydroxy-3-oxy-2-phenyl-TMI
2.4 1,3-dioxy-2-benzyl-TMI
2.5 2-chloromethyl-1,3-dioxy-TMI
2.6 2-bromomethyl-1,3-dioxy-TMI
2.7 2,2'-bis(1,3-dioxy-TMI-2-yl)ethane
2.8 2-(2',2'-dimethoxyethyl)-1,3-dioxy-TMI
2.9 1,3-dioxy-TMI
2.10 ethyl 3-(1',3'-dioxy-TMI-2'-yl)-2-(2''-pyridyl) propionate
2.11 5-methyl-5-(1',3'-dioxy-TMI-2'-yl) barbituric acid
2.12 diethyl 2-methyl-2-(1',3'-dioxy-TMI-2'-yl) malonate
2.13 2-(2'-[2''-pyridyl]propyl)-1,3-dioxy-TMI
2.14 α-(o-hydroxyphenyl)-β-(1,3-dioxy-TMI-2-yl)propionic acid choline ester
2.15 leucyl 2-(o-benzyloxyphenyl)-4-(1',3'-dioxy-TMI-2'-yl)propionic acid choline ester
2.15 leucyl 2-(o-benzyloxyphenyl)-4-(1',3'-dioxy-TMI-2'yl)-1-butylamine
2.16 2-[5'-(1''-methylbutyl)-5'-(1''',3''''-dioxy-TMI-2'''-ylmethyl) barbituryl]ethyl phosphate
2.17 2,6-dimethyl-3,5-diazatricyclo[5.2.1.0$^{2,6}$]deca-3,8-dien-5-oxyl-3-oxide
2.18 1-oxy-2-phenyl-3-hydroxy-TMI by reduction of 1,3-dioxy-2-phenyl-TMI
2.19 1,3-dioxy-2-trifluoromethyl-TMI
2.20 1,3-dioxy-TMI 2.1a. N,N'-dihydroxy - 2,3 - diamino-2,3-dimethylbutane (100 mg. 0.7 millimole) was dissolved in boiling benzene (25 ml.) and treated with phenyl acetaldehyde (0.08 ml.; 0.7 millimole). The solution was refluxed (1 hr.) with an addition funnel containing sodium sulfate between the flask and condenser to dry the refluxing benzene. The residue after evaporation was dissolved in 10% ether-petroleum ether and chromatographed on silica by elution with the same solvent mixture. The product crystallized from chloroform-hexane as colorless needles, M.P. 106–108° (60 mg.).

(b) 2-benzyl - 1,3-dihydroxy-4,4,5,5-tetramethyl-1,3-diazole (1 g.; 4.2 millimoles) in benzene (25 ml.) was stirred for 3 hours with lead dioxide (3.5 g.; 14.6 millimoles). The mixture was filtered and the pink filtrate evaporated under reduced pressure. The residue was recrystallized from chloroform-hexane under nitrogen atmosphere to give the product (600 mg.), M.P. 110–111°.

(c) 2-benzyl-1-hydroxy-3-oxy-TMI (30 mg.; 0.12 millimole) in benzene (25 ml.) was stirred for 20 mins. with lead dioxide (1 g.; 4.2 millimoles). The filtrate was evaporated under vacuum and the residual oil chromatographed on silica by elution with 10% ether-petroleum ether. Chromatographically-pure radical was obtained as a deep purple viscous oil, yield almost quantitative.

2.2a.—A solution of N,N'-dihydroxy-2,3-diamino-2,3-dimethylbutane, 4.44 g. (0.3 mole) in 150 ml. of methanol to which 3.5 g. (0.33 mole) of benzaldehyde was added, was stirred for 24 hours at room temperature. The white precipitate which had formed was filtered thus yielding 2.67 g. of product. Upon concentration of the mother liquors a second crop was obtained: total yield 74.3%. The melting point of the recrystallized material (from benzene/ether) was 168–169°. The mass and NMR spectra were in agreement with the structure of 1,3-dihydroxy-2-phenyl-4,4,5,5-tetramethyldiazolidine-1,3.

Analysis.—$C_{13}H_{20}N_2O_2$: Calculated: C, 66.08; H, 8.53; N, 11.85; O, 13.55. Found: C, 66.17; H, 8.72; N, 12.02.

(b) The 1,3-dihydroxy - 2 - phenyl-4,4,5,5-tetramethyl-1,3-diazolidine (1.45 g., 0.00615 mole) dissolved in 250 ml. of benzene was treated with 20 g. of $PbO_2$ at room temperature for 45 minutes. The reaction mixture was filtered through $MgSO_4$ and the deep blue benzene solution was evaporated in vacuum. A crystalline dark blue solid was isolated: yield 1.43 g. (100% yield). The product was soluble in all organic solvents as well as water; it was recrystallized from ether and its melting point was 85°. The mass spectrum gave a molecular ion of 233 corresponding to the molecular weight of 1,3-dioxy-2-phenyl-TMI.

*Analysis.*—$C_{13}H_{17}N_2O_2$: Calculated: C, 66.93; H, 7.34; N, 12.00; O, 13.71. Found: C, 67.03; H, 7.41; N, 12.04. The ESR spectrum gave a typical 5-line pattern ($a_N$ 7.5 g. in benzene).

2.3.—1,3-dihydroxy - 2 - phenyl-4,4,5,5-tetramethyl-1,3-diazolidine (see Example 2.2), (50 mg., 0.21 mole) dissolved in 25 ml. of benzene was treated with $PbO_2$ for 15 minutes at room temperature. The reaction was followed by thin layer chromatography. At this stage the chromatographic plate had only one spot which turned blue upon exposure to $I_2$. The reaction mixture was immediately filtered and the solvent evaporated in vacuum. A white solid was isolated, approx. yield 30 mg. (60%), which was identified as the 1-hydroxy-2-phenyl-3-oxy-TMI by analytical and spectroscopic methods. Upon standing in the air, the solid quickly turned blue and on treating the white material with $PbO_2$ in benzene, a blue solution was immediately obtained. The blue product could be isolated nearly quantitatively by filtration and evaporation of the solvent. It was found to be identical to the product of Example 2.2.

2.4.—2 - benzyl - 1,3 - dihydroxy - 4,4,5,5 - tetramethyl-tetrahydroimidazole (1 g.; 4.2 millimoles) in benzene (50 ml.) was stirred for 30 minutes with lead dioxide (40 g.; 0.17 mole). The mixture was filtered and the filtrate evaporated under reduced pressure to give the radical 2-benzyl-1,3-dioxy-TMI as a deep purple viscous oil, the yield was almost quantitative.

2.5.—Dry chloroacetaldehyde (7.5 ml.; 60 millimoles), prepared by a similar procedure to that used for bromoacetaldehyde, was stirred in benzene (7.5 ml.) over anhydrous calcium sulphate, and cooled during addition of the bishydroxylamine (Ex. 1.1) (0.5 g.; 3.4 millimoles). Stirring was continued at room temperature for 1 hr. The mixture was filtered and the filtrate stirred for 2 mins. with lead dioxide (7 g.). After filtration and dilution with chloroform, the solution was washed with water, dried over sodium sulphate and evaporated in vacuo. The residue was chromatographed on silica by elution with ether. The purple product, 2-chloromethyl-1,3-dioxy-TMI (250 mg., 35%), was crystallized as needles on concentration of the solution in hexane at room temperature in vacuo: M.P. 73–75°.

*Analysis.*—$C_8H_{14}N_2O_2Cl$: Calculated: C, 46.71; H, 6.86; N, 13.62; Cl, 17.24. Found: C, 46.86; H, 6.59; N, 13.58; Cl, 17.17.

2.6a.—Bromoacetaldeyde [1] (2 ml.; 16 millimoles) was stirred for 30 mins. in benzene (10 ml.) with the bishydroxylamine (Ex. 1.1) (500 mg.; 3.4 millimoles) and anhydrous calcium sulfate (1 g.) while cooling initially in ice. The mixture was filtered, and the organic fraction of the residue dissolved in ether. This solution was filtered and evaporated to give crude product which was further purified by chromatography on silica with ether: yield 630 mg. (70%), M.P. 123–124° (decomp.).

*Analysis.*—$C_8H_{17}N_2O_2Br$: Calculated: C, 37.98; H, 6.77; N, 11.07; Br, 31.59. Found: C, 37.84; H, 6.89; N, 11.10; Br, 31.36.

(b) 2-bromomethyl - 1,3 - dihydroxy-4,4,5,5-tetramethyl imidazolidine (0.2 g.; 8 millimoles) in ether (15 ml.) was stirred with lead dioxide (2 g.) for 15 minutes. After filtration, the filtrate was concentrated and chromatographed on silica by elution with ether. The principal product (140 mg.; 55%) crystallized as needles from hexane on concentration of the solution in vacuo: M.P. 93–94°.

*Analysis.*—$C_8H_{14}N_2O_2Br$: Calculated: C, 38.43; H, 5.64; N, 11.20; Br, 31.95. Found: C, 38.39; H, 5.67; N, 11.22; Br, 31.76.

2.7a.—N,N'-dihydroxy - 2,3 - diamino-2,3-dimethylbutane (3.0 g.; 0.02 mole) was suspended in benzene (250 ml.). An ethereal solution (30 ml.) of succinaldehyde (prepared by hydrolysis of 5.8 g. of succinaldehyde oxime and concentration of the ethereal succinaldehyde solution to 50 ml.) was added and the solution refluxed for 30 minutes. The solvent was then removed by evaporation and the solid residue chromatographed on silica gel (80 g.) using ether as eluent. The required product began to elute from the column after 125 ml. of eluent had been collected and was present in the next 350 ml. of eluent. The solvent was removed to yield 2.7 g. (77%) of 1,2-bis-[2',2'-(1',3'-dihydroxy - 4',4',5',5' - tetramethyl-1',3'-diazole)]ethane. M.P. 212–216° (from ethyl acetate/benzene).

*Analysis.*—$C_{16}H_{34}N_4O_4$: Calculated: C, 62.23; H, 9.50; N, 13.20. Found: C, 62.15; H, 9.27; N, 13.48.

2.7b.—To 1,2-bis[2',2' - (1',3' - dihydroxy - 4',4',5',5'-tetramethyl-1',3'-diazolidin]ethane (104 mg.) suspended in benzene (40 ml.) was added lead dioxide (1.0 g.). The mixture was warmed and shaken for 5 minutes. After this time, thin layer chromatography showed only 1,2-bis-(1',3' - dioxy - 4',4',5',5' - tetramethylimidazoline - 2 - yl) ethane present. The solution was filtered and the solvent removed under reduced pressure. The semicrystalline residue was recrystallized from benzene/petroleum ether 30–60° to give 45 mg. of product. M.P. 160–161°.

*Analysis.*—$C_{16}N_{28}N_4O_4$: Calculated: C, 56.45; H, 8.29; N, 16.46. Found: C, 56.38; H, 8.13; N, 16.62.

2.8.—To N,N'-dihydroxy - 2,3 - diamino-2,3-dimethyl butane (100 mg.) and malonaldehyde tetramethyl ketal (500 mg.) in methanol (50 ml.) was added 50% sulfuric acid (2.5 ml.) and the mixture stirred for 66 hrs. Ammonium hydroxide was then added until the solution was just alkaline. The solution was filtered, dried over sodium sulphate and filtered again. A little of the solution was oxidized with lead dioxide and the ESR spectrum of the radical found was consistent with the formation of 2-(2',2'-dimethoxy-ethyl)-1,3-dioxy-TMI.

2.9—N,N' - dihydroxy-2,3-diamino-2,3-dimethylbutane (10 mg.) in 10 ml. of benzene was heated with 100 mg. of chloromethyl ether at reflux for 5 minutes. The resulting mixture was then heated with stirring with solid sodium carbonate, filtered and then washed with water. After drying over sodium sulfate, the resulting solution was stirred with excess $PbO_2$ and then filtered. On evaporation of the solvent a bright red residue of the 1,3-dioxy-TMI was obtained.

2.10a.—To a solution of 10 g. 2-pyridyl acetate (60.6 mmole) in 100 ml. dimethyl formamide cooled to 0° was added 1.46 g. sodium hydride (60.6 mmole). The reaction was stirred under nitrogen for 10 min., warmed to 25° and stirred 30 min., then recooled to 0°. A solution of 18.0 bromoacetaldehyde diethyl acetal (91.2 mmole) in 20 ml. dimethyl formamide was added dropwise and the reaction was then stirred and placed in a 70° bath for 5 hours and let stand at 25° overnight. The mixture was poured into water and washed once with salt, dried, evaporated and distilled to give 8.5 g. (49%) of the product as a light yellow oil (B.P. 125–135°/0.1 mm.).

(b) A solution of 0.660 g. pyridyl-ester-acetal (2.42 mmole) in 5 ml. ethanol and 20 ml. 0.1 N hydrochloric acid was refluxed for 30 min. and evaporated to dryness. The residual oil was dissolved in 20 ml. methanol and 0.358 g. N,N'-dihydroxy-2,3-diamino-2,3-dimethylbutane (2.42 mmole) was added. After 1.5 hours at 25° the solution was diluted with water, aqueous sodium bicarbonate and chloroform. An aqueous solution of sodium periodate was added in portions, with vigorous shaking between additions, until additional oxidant no longer increased the radical color. The chloroform solution was washed, dried and evaporated to a red oil which was chromatographed on silica with 5% methanol-ether as eluent. A total of 0.255 g. of the radical product was obtained as a viscous oil.

2.11a.—The malonic ester, diethyl 2-(2',2'-diethoxy-ethyl)-2-methylmalonate (10.0 g., 0.0345 mol) and urea (2.63 g., 0.0438 mol) were added to a solution of sodium

---

[1] Prepared as set forth in "Fischer and Landsteiner, Chem. Ber." 25, 2549 (1892).

(1.83 g., 0.0794 mol) in 48.5 ml. dry ethanol. The solution was gradually concentrated to 12 ml. by slow distillation over 2 hours and then heated to 85° for 4 hours, followed by stirring at room temperature for 12 hours. The semicrystalline reaction mixture was then cooled to 10° and 39 ml. ice cold water was added. The water solution was extracted with benzene (2× 14 ml.), the combined benzene extracts washed with a little water and the combined water phase was acidified with 8 N HCl. After stirring for some time at 5°, 5.7 g. (64%) of 5-methyl-5-(formylmethyl)-barbituric acid diethyl acetal had precipitated. A sample recrystallized from benzene melted at 100–110°.

(b) The acetal (1.90 g., 0.00736 mol) was refluxed for 1 hour in 23 ml. of 0.067 N HCl and then cooled with stirring at 0°. The precipitated white crystals were washed with a little ice cold water and recrystallized from ethanol to give 0.87 g. (65%) of 5-methyl-5-(formylmethyl)-barbituric acid M.P. 247–249° d.

Analysis.—$C_7H_8N_2O_4$: Calculated: C, 45.65; H, 4.38; N, 15.21. Found: C, 45.56; H, 4.49; N, 15.38.

(c) The aldehyde prepared above (0.5 g., 0.0027 mol) was mixed with N,N'-dihydroxy-2,3-diamino-2,3-dimethylbutane (0.41 g., 0.0028 mol) in 20 ml. absolute ethanol. The solution was stirred at room temperature for 3½ hrs. Then 5.0 g. lead dioxide was added and stirring continued for 10 minutes. The deep red reaction mixture was filtered through Celite, evaporated in vacuo and the residue chromatographed on silica with a 9:1 mixture of chloroform-methanol. The main red band yielded 0.22 g. (26%) of barbituric acid radical 5-methyl-5-(1',3'-dioxy-TMI-yl-2)barbituric acid. A sample (0.22 g.) recrystallized from methanol-ether gave deep red needles (0.15 g.), M.P. 213–216° d.

Analysis.—$C_{13}H_{19}N_4O_5$: Calculated: C, 50.1; H, 6.1; N, 18.0. Found: C, 50.26; H, 5.97; N, 17.96.

2.12.—The malonic ester diethyl 2-methyl-2-(2',2'-diethoxyethyl)malonate (4.0 g., 0.0138 mol) was refluxed in 20 ml. 0.2 N hydrochloric acid for 3 min. The reaction mixture was then cooled to room temperature and extracted with ether (3×25 ml.). After evaporation of the ether the residual colorless oil was dissolved in 100 ml. benzene followed by addition of 2.04 g. (0.0138 mol) of 2,3-bis-hydroxylamino-2,3-dimethylbutane. This mixture was stirred for 45 min. Lead dioxide (20.0 g.) was then added with some cooling and the mixture was stirred for another 8 min. The deep red reaction mixture was filtered through Celite and evaporated to dryness in vacuo. The resulting red oil was chromatographed on silica with ether. The red fraction was collected and evaporated in vacuo to yield red crystals of the diester radical diethyl 2-methyl-2-(1',3'-dioxy-TMI-2'-yl)malonate. Recrystallization from petroleum ether yielded 1.60 g. (33%), M.P. 70–71°.

Analysis.—$C_{16}H_{27}N_2O_6$: Calculated: C, 55.9; H, 7.87; N, 8.16. Found: C, 55.84; H, 7.81; N, 8.30.

2.13a.—A solution of 2-ethylpyridine (13.9 g., 0.13 mol) in 50 ml. of dry ether was added dropwise during 15 min. to a solution of phenyllithium in benzene (60 ml., 2 moles), with stirring under dry nitrogen. This mixture was refluxed for 30 min. and chloroacetaldehyde diethylacetal (9.91 g., 0.0647 mol) was then added with continued heating for 5 hours followed by stirring at room temperature for 12 hours. The brown reaction mixture was then poured over ice (50 g.), whereupon a brown oil separated. The water phase was extracted with ether (3× 100 ml.) and the combined ether phases dried over potassium carbonate and evaporated in vacuo. The residual brown oil gave on distillation the pyridylacetal, 2-(2'-pyridyl)propionaldehyde diethylacetal, B.P. 83–85°/ 0.05 mm. Hg, 7.0 g. (49%).

Analysis.—$C_{13}H_{21}NO_2$: Calculated: C, 69.92; H, 9.48; N, 6.27. Found: C, 69.95; H, 9.28; N, 6.27.

(b) The above acetal (2.0 g., 0.00896 mol) was refluxed in 29 ml. of 0.031 N hydrochloric acid. After 15 min. the solution became clear and was then cooled to room temperature and made alkaline with 1 N sodium hydroxide. An oil separated and the water phase was extracted with ether (3× 50 ml.). The combined ether extracts were dried with potassium carbonate and evaporated in vacuo.

To the resulting colorless oil was added a solution of N,N'-dihydroxy-2,3-diamino-2,3-dimethylbutane (1.33 g., 0.00896 mol) in 50 ml. ether. This mixture was stirred for 2 hrs. at room temperature, and then evaporated to dryness in vacuo. The resulting oil was dissolved in 50 ml. of benzene and stirred with lead dioxide (13.3 g.) for 10 min. at room temperature. The mixture was then filtered over Celite, evaporated to dryness in vacuo and chromatographed over silica with a 1:9:10 mixture of methanol-ethyl acetate-benzene. The deep red fraction containing the radical was evaporated to dryness, and recrystallized from ether-petroleum ether to give 0.97 g. (39%) of the pyridyl radical, 2-(2'-[2''-pyridyl]propyl)-1,3-dioxy-TMI, deep red crystals M.P. 113–116.

Analysis.—$C_{15}H_{22}N_3O_2$; C, 65.2; H, 7.97; N, 15.21. Found: C, 65.36; H, 7.71; N, 15.33.

2.14a.—A mixture of 0.752 g. (2.31 mmole) of methyl 2 - (2'-methoxymethoxyphenyl)-4,4-diethoxybutyrate, 0.5 ml. 1 M sodium hydroxide, 4 ml. water and 3 ml. methanol was refluxed for 1.5 hours. The cooled reaction mixture was poured into water and washed three times with chloroform to remove unreacted starting material. In this manner 0.160 g. of starting material (20%) was recovered. The aqueous solution was then acidified to pH 3 and rewashed with chloroform giving 0.610 g. (83%) of colorless oil.

(b) A solution of 0.60 g. of the above product (1.92 mmole) in 1.92 g. triethyl amine (dry) (19.2 mmole) and 20 ml. ether was cooled to 0° C. A solution of ethyl chloroformate (0.210 g., 1.92 mmole) in 2 ml. ether was added dropwise with stirring. The precipitation of triethylamine hydrochloride began almost immediately and the reaction was stirred at 0° C. for 1 hour. After filtering, the solvent was removed under reduced pressure to give 0.70 g. colorless oil (95%).

(c) The mixed anhydride of the preceding preparation (0.81 g., 2.1× $10^3$ mol) was dissolved in 5 ml. of dry N,N-dimethylformamide. Choline iodide (2 equivalents) was added and the resultant yellow solution stirred at room temperature for 16 hours.

The dimethylformamide solution was concentrated to 3 ml. in vacuo (50° C., 1 mm. Hg) and ether (25 ml.) added. A white solid precipitated which was filtered off. The resultant solution was evaporated to dryness. Acetic acid (10 ml.) and 0.1 N hydrochloric acid (10 ml.) were added and the solution stirred at 85° C. for 20 minutes. The acid was removed in vacuo at 40° C. The residue was dissolved in methanol:water (1:1) and N,N'-dihydroxy-2,3-diamino-2,3-dimethylbutane was added.

This solution was stirred at room temperature for 3 hours. Most of the methanol was removed in vacuo at room temperature. An additional 60 ml. of water was added and followed by enough aqueous sodium bicarbonate to adjust the pH to 7. Aqueous sodium metaperiodate was added dropwise to a maximum pink color, but so that no excess of periodate existed in the solution. The aqueous solution containing the radical was extracted with chloroform and the aqueous phase freeze dried. The residue was dissolved in chloroform:methanol (1:4) and filtered. The resultant solution was chromatographed (silica, ether:methanol, 1:1). The material was removed from the silica gel with methanol and concentrated in vacuo to give α-(o-hydroxyphenyl)-β-(1,3-dioxy-TMI-2-yl)propionic acid choline ester.

2.15a. A mixture of 8 g. of methyl o-hydroxyphenylacetate (4.82 mmole), 7.9 g. of benzyl chloride (6.25 mmole), 8.0 g. of potassium iodide (4.82 mmole), 26.8 g. of potassium carbonate (19.2 mmole) and 175 ml. acetone was stirred and refluxed for 24 hours. The solids were removed by filtration and the filtrate evaporated to dryness. After dissolving the residue in ether, the ether solution was washed with dilute base followed by saturated aqueous ammonium chloride. Evaporation of the volatiles gave a yellow oil which was vacuum distilled, boiling at 155–162° C. at 0.3 mm. Hg. The light yellow oil crystallized on standing and could be recrystallized from ether-hexane.

(b) To a cold solution of 3.03 g. of methyl o-benzyl-oxyphenylacetate (11.8 mmole) in 50 ml. dry dimethylformamide under nitrogen was added 0.34 g. of sodium hydride (14.2 mmole), the solution stirred at room temperature for 1 hour, and then recooled at 5° C. To the solution was then added dropwise over 5 minutes a solution of 3.5 g. of bromoacetaldehyde diethyl acetal (17.7 mmole) in 5.0 ml. dimethylformamide. After stirring the mixture at 25° C. for 3.5 hours, the mixture was poured into water and the water extracted 4 times with ether. The combined ether extracts were evaporated to give a light yellow oil distilling at 190–192° C. at 0.1 mm. Hg.

(c) Saponification of 2 g. of the above ester was carried out as described in the prior example. A mixed anhydride was then prepared using ethyl chloroformate as described in the same example.

(d) To a saturated ethereal solution of ammonia was added dropwise 2.05 g. of the above product (4.77 mmole) in ether at 5° C. with vigorous stirring. An excess of ammonia was maintained. After stirring at 5° C. for 30 minutes and at ambient temperatures for an additional 30 minutes, the solution was evaporated to yield a light yellow oil.

(e) To a suspension of 0.66 g. of lithium aluminum hydride (17.5 mmole) in 40 ml. tetrahydrofuran under nitrogen at 0° C. was added a solution of 2.11 g. of the above product (5.8 mmole) in 10 ml. tetrahydrofuran. The mixture was stirred for 1 hour at 25° C. and then refluxed for 5 hours. After cooling the mixture to 5° C., the excess hydride was decomposed by the cautious addition of saturated aqueous sodium sulfate. The organic solution was decanted from the inorganic salts, the salts washed several times with ether and the combined ether phases dried and evaporated to yield 1.74 g. of a light yellow oil. Purification was achieved by chromatography on silica with ether as the initial eluent to remove traces of starting material. Elution with 20% methanol/ether gave 1.68 g. of the amine product as a light yellow oil.

(f) To a solution of 0.403 g. of the above product (1.185 mmole) and 0.242 g. dicyclohexylcarbodiimide (1.185 mmole) in 10 ml. ethyl acetate was added 0.293 Boc-leucine hydrate (1.185 mmole). (Boc-tert.butyloxycarbonyl). The mixture was stirred at 25° C. for 24 hours, filtered and evaporated to give 0.710 g. of colorless oil. Chromatography on silica with 1:1 ether:hexane gave 0.658 g. (100%) of the Boc-leucyl derivative as a viscous oil.

(g) A solution of 0.180 g. of the above product in 5 ml. 1 N hydrochloric acid and 5 ml. glacial acetic acid was warmed at 90° C. for 15 minutes. Carbon dioxide evolution was observed and judged to be completed within this time period. The solvents were evaporated to approximately 1 ml. and 10 ml. of methanol was added. The pH was adjusted to 9 with 1 M sodium hydroxide and 100 mg. N,N'-dihydroxy-2,3-diamino-2,3-dimethylbutane was added. After stirring for 1 hour at 25° C. the methanol was removed and the residue oxidized with aqueous sodium periodate in the normal manner. The chloroform soluble radical, leucyl 2-(o-benzyloxyphenyl)-4-(1,3-dioxy-TMI-2'-yl)-1-butylamine, was purified by preparative thin layer chromatography with 10% methanol/ether as eluant.

2.16a.—To 3.13 ml. ($3 \times 10^{-3}$ mol) of 0.96 M. sodium ethoxide in ethanol was added 1.1 g. ($3 \times 10^{-3}$ mol) of 5-(1-methylbutyl) - 5 - (1,3-dioxy-TMI-2'-ylmethyl) barbituric acid (prepared as described in co-pending application Ser. No. 794,008, filed Jan. 27, 1969). After stirring the mixture for 2 hours, the methanol was removed in vacuo and a solution of 0.369 g. of -chloroethyl acetate in 15 ml. of dry dimethyl formamide was added. After heating the mixture at 48° C. for 48 hours with stirring, the dimethyl formamide was removed in vacuo, leaving a residue which was dissolved in 2 N aqueous sodium hydroxide. After extracting the solution with methylene chloride, the aqueous phase was allowed to stand for 2 hours, acidified with acetic acid to a pH 5 and then extracted again with methylene chloride. The extracts were dried over sodium sulfate and the volatiles removed in vacuo.

The residue was dissolved in benzene and 0.16 g. of pyridine (0.0021 mol) and 0.16 g. of trimethylsilylchloride (0.0015 mol) were added. After stirring the mixture for 2 hours and then removing all volatiles in vacuo, the product was purified by preparative thin layer chromatography. After removing the product from the silica gel with methanol, two drops of acetic acid were added and the solution heated to about 50° C. under nitrogen and maintained at that temperature for 16 hours. The methanol was then removed in vacuo and the product purified by preparative thin layer chromatography (3:1 benzene/acetone) to yield 61 mg. of the desired product.

(b) In 20 ml. of dry pyridine to which had been added 3 ml. of a 0.674 M solution of cyanoethyl phosphate ($2 \times 10^{-3}$ mol) in pyridine was added 400 mg. of the above product and the solution taken to dryness in vacuo, while maintaining the temperature below 30° C. To the residue was added 20 ml. of dry pyridine, the solution evaporated and this treatment with pyridine repeated two additional times.

Finally, an additional 20 ml. of dry pyridine was added and 1 g. of dicyclohexylcarbodiimide ($4 \times 10^{-3}$ mol). After allowing the solution to stand for 16 hours (care should be taken that the time is not unduly extended), 1 ml. of water was added, the mixture stirred for 2 hours, filtered and volatiles removed. The residue was a gum which was dissolved in buffered water having a pH 4.8 and the aqueous solution extracted with methylene chloride. The aqueous phase was taken to dryness in vacuo, keeping the temperature below 30° C., leaving a gum.

The gum was dissolved in 20 ml. of 0.5 M aqueous lithium hydroxide, the solution heated at 50° C. for 5 hours and then acidified to a pH 6 with acetic acid. After centrifugation to remove insoluble inorganic phosphate, the solution was taken to dryness in vacuo maintaining the temperature below 30° C. to yield a gum which was purified by preparative thin layer chromatography. The product was a hygroscopic solid, which while contaminated with silica gel, was a single compound 2-(5'-(1''-methylbutyl)-5'-(1'',3'' - dioxy - TMI-2''-ylmethyl)barbituryl) ethyl phosphate by thin layer chromatography.

2.17.—To the filtrate and wash of example 1.3 containing 2,3-dihydroxylamino - 2,3 - dimethylbicyclo[2.2.1]-2-heptane at pH=7.5 was added 1 ml. of Formalin. The resulting solution was stirred at room temperature for 0.5 hrs.

To the above solution was added 20 ml. of saturated sodium bicarbonate and 20 ml. of water. It was poured into a separatory funnel together with 25 ml. of methylene chloride. An aqueous solution of $NaIO_4$ was added dropwise (with frequent shaking to extract the radical into the organic phase) until the pink color no longer persisted with the addition of the next drop of $NaIO_4$. The methylene chloride phase was separated and the aqueous phase washed with five 20 ml. portions of methylene chloride. The combined extracts were washed with saturated NaCl, dried, and concentrated in vacuo at room temperature to yield 2,6-dimethyl-3,5-diazatricyclo[5.2.1.0$^{2,6}$] - deca - 3,8-dien-5-oxyl-3-oxide.

2.18.—1-Oxy-2-phenyl-3-hydroxy-TMI is obtained by treating 1,3-dioxy-2-phenyl-TMI dissolved in glyme with an excess of a sodium metal dispersion. Upon disappearance of the blue color, the reaction mixture was immediately poured into methanol containing enough HCl to keep the mixture acidic. The solvents were evaporated in vacuum and the residue was treated with powdered anhydrous sodium carbonate. The residue was triturated with methanol previously purged with nitrogen, and the methanolic solution was then chromatographed on silica gel. (All the above mentioned operations were carried out under nitrogen. The product was isolated as a white crystalline solid which was identical to the product of the controlled $PbO_2$ oxidation in Example 2.3.

2.19.—One equiv. of N,N'-dihydroxy-2,3-diamino-2,3-dimethylbutane is suspended in benzene containing from about 2 to 10 equivalents of pyridine. A mild excess under stoichiometric of trifluoroacetic anhydride is added while stirring at room temperature. After allowing the mixture to stir for a sufficient time, an intense color is developed. When the reaction appears to have been complete, the mixture is washed with water, the solvent evaporated, and the product purified.

2.20.—Into tetrahydrofuran is introduced 1 equiv. of N,N'-dihydroxy - 2, - diamino - 2,3 - dimethylbutane, 1 equiv. of the ethyl orthoester of formic acid and 1 equiv. of benzenesulfonic acid. The mixture is warmed on a steam bath for a time until the solution's color no longer appears to deepen. The solution is then extracted with sodium carbonate, the volatile materials removed by evaporation and the product isolated.

Group 3

In preparing 1-one-2-phenyl-3-oxy-TMI chloride 1,3-dioxy-2-phenyl-TMI is dissolved in an inert solvent such as benzene or carbon tetrachloride and a stoichiometric excess of chlorine gas is introduced into the solution with agitation. After the addition of chlorine is complete, the solution is stripped of solvents and the product isolated.

*Analysis.*—$\mu^{KRB}$ 1600 (w), 1580 (w) and 1140 cm-1; 234 (5-ArH) and 8.17 (singlet, 4-$CH_3$) ($SO_2Cl_2$).

Group 4

4.1 2-phenyl-1-oxyl-TMI ($PbO_2$)
4.2 2-phenyl-1-oxyl-TMI ($NaNO_2$)
4.3 2-phenyl-1-oxyl-TMI ($PbO_2$, HOAC)
4.4 2-methyl- and 2-bromomethyl-1-oxyl-TMI
4.5 2-benzoyl-1-oxyl-TMI
4.6 2-isopropyl-1-oxyl-TMI
4.7 1-oxyl-4,5-dibenzyl-4,5-dimethylimidazoline
4.8 1-oxyl-TMI (phosphite)

4.1.—The compound 1-hydroxy-2-phenyl-TMI (0.200 g.) dissolved in 100 ml. of benzene was treated with $PbO_2$, 4 g., by vigorous stirring at room temperature for 35 minutes. The reaction mixture was filtered and the solvent from the filtrate removed in vacuo. The orange brown oil was chromatographed over silica gel (1¼" x 12" column) by elution with benzene. The orange brown fractions were combined and evaporated in vacuo. The residual crystalline product, 1-oxy-2-phenyl-TMI, melted at 27–28° C. and the yield was 76%; molecular ion at 217.

*Analysis.*—$C_{13}H_{17}N_2O$: Calculated (percent): C, 71.85; H, 7.89; N, 12.90. Found (percent): C, 71.55; H, 7.63; N, 12.92.

4.2a.—The radical, 1,3-dioxy-2-phenyl-TMI (47 mg.), together with 0.250 g. of sodium nitrite and 3 drops of conc. HCl, in 5 ml. of dimethylformamide (DMF) was stirred and heated on the steam bath for 10 minutes. At this stage the deep blue color was replaced by an orange brown color. The reaction mixture was filtered, and the filtrate was diluted with 30 ml. benzene and treated with $PbO_2$. After filtration, the solution was evaporated in vacuo on the steam bath and the orange brown liquid residue (DMF+product) was chromatographed on silica gel by elution with benzene/ether (1:1). The orange brown band was collected and the solvent evaporated. The viscous brown product, 1-oxyl-2-phenyl-TMI, 50 mg., yield 90%, was found by thin layer chromatography to be pure and identical to the compound obtained from the previous example.

4.2b.—Following the above procedure 1,3-dihydroxy-2-phenyl-dihydro-TMI and 1-hydroxy-2-phenyl-3-oxy-TMI were used in place of 1,3-dioxy-2-phenyl-TMI to provide the same product.

4.3a.—The radical 1,3-dioxy-2-phenyl-TMI (2 mg.) in 1 ml. of dimethylformamide was treated with 3 drops of glacial acetic acid and about 5 mg. of $PbO_2$. After stirring for several minutes the solution had become yellow-orange and displayed the typical ESR pattern displayed by the 1-oxylimidazoline radical. Dilution of the reaction mixture with water, extraction with chloroform and evaporation of the chlorofrm extracts yielded the crude product.

(b) Following substantially the same procedure used above except that the imidazolidine 1,3-dihydroxy-2-phenyl-dihydro-TMI or 1 - hydroxy-2-phenyl-2-oxy-TMI was used in place of the radical reactant, the same end product was obtained.

4.4a.—A solution of about 2 mg. of the 1,3-dihydroxy-2-methyl-dihydro-TMI in 1 ml. of dimethylformamide was treated with 3 drops of glacial acetic acid and about 5 mg. of $PbO_2$. The solution initially became red and then turned to yellow-orange. The ESR spectrum showed an intense signal corresponding to the new radical 1-oxyl-2-methyl-TMI. The mixture could be worked up as in the preceding examples.

(b) Following substantially the same procedure as above, except that 1,3-dihydroxy-2-bromomethyl-dihydro-TMI was used in place of the methyl analog above, the radical 1-oxyl-2-bromomethyl-TMI was obtained.

4.5.—2-benzoyl-1-hydroxy-TMI (10 mg.) was stirred for 5 min. in ether (15 ml.) with lead dioxide (200 mg.). After filtration and evaporation, the residue was chromatographed on silica with ether. The dark orange colored product (8 mg.) was recrystallized from ether-petroleum ether at room temperature by concentrating the solution in vacuo: M.P. 74–75°.

*Analysis.*—$C_{14}H_{17}N_2O_2$: Calculated (percent): C, 68.55; H, 6.99; N, 11.42. Found (percent): C, 68.39; H, 6.88; N, 11.34

The compound showed absorption maxima at 252 ($\epsilon$=16,700) and 317 m$\mu$ (shoulder) ($\epsilon$=1,400) (hexane); and at 6.11, 6.25, 7.31, 7.58, 8.22, 8.36, 8.51, 8.80 and 14.7$\mu$ (carbon tetrachloride). In the ESR spectrum, $A_N$=8.5, $A_N'$=4.2 Gauss (benzene).

4.6.—The radical 1,3-dioxy-2-isopropyl-TMI (20 mg.) was dissolved in 5 ml. DMF and 0.150 g. of sodium nitrite was added together with a few drops of conc. HCl. The reaction mixture was stirred and heated over the steam bath for 5–10 minutes or until the purple color was replaced by a yellow brown color. Benzene, 20 ml. was then added together with a small portion of $PbO_2$. The reaction mixture was filtered, the filtrate evaporated in vacuo, and the yellow brown liquid residue chromatographed over silica gel with benzene at eluent. The yellow brown band was collected, evaporated in vacuo, and the brown product, 1-oxyl-2-isopropyl-TMI (7.5 mg.) was obtained as a liquid. The ESR spectrum gave the typical 7-line pattern (1,1,2,1,2,1,1) for 2 nonequivalent nitrogens: $a_{N_1}$ 9.25 g.; $a_{N_2}$ 4.0 g.; $a_H$ 1.25 g. The mass spectrum showed a molecular ion at $m./e.$=183.

4.7.—The radical 1,3-dioxy-4,5-dimethyl-4,5-dibenzyl-imidazolidine (50 mg.) was dissolved in dimethylformamide (5 ml.) containing a trace (<1 mg.) of hydrogen chloride gas. Sodium nitrite (350 mg.) was added and the mixture shaken. The color changed rapidly from red to orange whereupon the mixture was poured into water and then extracted with chloroform. After drying and evaporating the chloroform solution, the resulting residue was chromatographed to yield the nitroxide, 1-oxyl-4,5-dimethyl-4,5-dibenzylimidazoline. The ESR spectrum displayed a typical 7-line pattern (1,1,2,1,2,1,1) with further coupling due to the hydrogen at position 2.

4.8.—A solution of 20 mg. of the radical, 1,3-dioxy-TMI in chloroform was heated on a steam bath with 100 mg. of triphenylphosphine and then allowed to stand for three days at room temperature. The solution was carefully evaporated to dryness and the residue was sublimed at room temperature under vacuum. The orange sublimate displayed the typical ESR spectrum of 1-oxyl-TMI with seven lines, each split further into a doublet by the hydrogen atom in the 2-position.

Group 5

5.1 Iodide displacement of chloride in 2-chloromethyl-1,3-dioxy-TMI
5.2 Copper coupling of 2-iodo-1,3-dioxy-TMI
5.3 Hydrolysis and decarboxylation of 2-methoxycarbonyl-1,3-dioxy-TMI
5.4 Oxidative dehydroxymethylation of 2-hydroxymethyl-1,3-dioxy-TMI
5.5 Monohydrolysis of diethyl methyl-1-(1',3'-dioxy-TMI-2'-yl) malonate 5.1.—2-chloromethyl-1,3-dioxy-TMI (100 mg.) was dissolved in a saturated solution (20 ml.) of potassium iodide in acetone. After 5 mins. at room temperature, the solution was evaporated in vacuo and the residue extracted with ether. Chromatographing in the dark on silica with the same solvent yielded 30 mg. (20%) of the dark blue product, 2-iodomethyl-1,3-dioxy-TMI, M.P. 58–60° C.

5.2.—1,3-dioxy-2-iodo-4,4,5,5-tetramethyl-4,5 - dihydro-imidazole (100 mg.) and copper powder (300 mg.) were vigorously stirred in dimethylformamide (2 ml.) and the temperature slowly raised to 65° C. Near this temperature the soltuion changed color from purple to red. The solution was then poured into water (10 ml.) and filtered. The filtrate was extracted with chloroform (2×10 ml.) and the chloroform extract dried over sodium sulfate, filtered and the chloroform removed in vacuo. The solid residue was washed twice with water and dried in vacuo to yield 35 mg. (65%) of the title compound. M.P. 220–222 (from benzene).

*Analysis.* — $C_{14}H_{24}N_4O_4$: Calculated (percent): C, 53.83; H, 7.74; N, 17.94. Found (percent): C, 53.94; H, 7.55; N, 17.87; M.W. (by mass spectrometry) 312.

5.3.—Two ml. of a solution of the ester methyl 1,3-dioxy-TMI-2-ylcarboxylate, (about 2 mg.) was shaken with aqueous sodium carbonate. A red color appeared in the aqueous layer which was identified as the sodium salt of the carboxylic acid by ESR spectroscopy. Acidification of this solution gave the ESR spectrum of 1,3-dioxy-TMI. This compound can be isolated by evaporation of the aqueous solution in vacuo and extraction of the residue with benzene. The resulting benzene solution may be evaporated to give 1,3-dioxy-TMI.

5.4. — 1,3-dihydroxy-2-hydroxymethyl-dihydro-TMI (3 mg.) was suspended in benzene (1 ml.). Lead dioxide (100 mg.) was added and the mixture shaked periodically. The benzene solution was examined every 15 minutes by thin layer chromatography (silica gel/ethyl acetate). Initially only one radical was present which was identical with that obtained by oxidation of 1,3-dihydroxy-2-hydroxymethyl-dihydro-TMI with manganese dioxide. However, a new radical began to form from the first radical and this conversion was complete after 3 hours. This new radical was shown to be 1,3-dioxy-TMI identical, as shown by thin layer chromatography and electron spin resonance, with the radical prepared by oxidation of 1,3-dihydroxy-dihydro-TMI.

5.5a.—The diester radical, diethyl methyl-1(1',3'-dioxy-TMI-2'-ylmethyl)malonate stirred in 45 ml., 0.0215 N sodium hydroxide for 18 hours at room temperature. The resulting solution was concentrated in vacuo to 5 ml. while maintaining the temperature below 20°. The remaining 5 ml. of solution was extracted with ether (3×15 ml.) and the ether extracts washed with a little water. The combined water phases were passed through a column containing 5.0 g. of cation exchange resin (Dowex 50W-X8). The column was eluted with 100 ml. water, and the eluate was concentrated in vacuo. Two drops of 0.2 N HCl were then added to the remaining water solution followed by contraction with chloroform (3×50 ml.).

The combined chloroform extracts were dried with magnesium sulfate, filtered and evaporated to dryness in vacuo. The residual red oil, on drying overnight in vacuum over phosphorous pentoxide, yielded red crystals of methyl-1(1',3'-dioxy-TMI-2'-yl)malonic acid monoethyl ester (0.184 g., 67%), M.P. 60°, (gas evolution at about 90°. The crystals were very hygroscopic but could be handled under dry nitrogen. Absorption maxima were observed in the IR spectrum at $v^{KBr}$ 1135, 1173, 1240, 1290 (max.), 1370, 1445, 1600 (broad), 1721, 2980 (M) and 3440 (M, broad). The mass spectrum showed no molecular ion but an ion at m./e. 271 (M-44) was observed.

By virtue of the presence of the stable free radical, the α-nitronylnitroxide compounds (V) and the α-iminonitroxide compounds (IV) have a wide variety of uses. Because they are stable free radicals, they can be introduced into reactions where reactive free radicals are formed and inhibit such reactions by reacting with the free radical. In addition, by having appropriate functionalities present on the molecule, the molecules can be reacted with a wide variety of natural compounds so as to spin label the compounds. Spin labelled biologically active compounds can be used in a variety of ways. See U.S. Pat. Nos. 3,453,288, 3,481,952 and 3,489,522. Furthermore, because of the excellent stability of many of these compounds, the compounds can be used in the measurement of weak magnetic fields by known techniques. Those compounds with a proton at the 2-postion are known to readily exchange the proton with a deuterium ion, so that the presnce of deuterium may be metered by the change in the electron spin resonance spectrum. It is found that concentrations of at least about 0.1 normal in deuterium are required in order to detect a significant change. Therefore, reactions involving the loss or gain of a deuterium ion can be metered by following the change in the electron spin resonance spectrum of the solution.

To demonstrate spin labeling using a compound of this invention, the following experiment can be carried out:

To a stirred solution of 1.0 g. ($1.5 \times 10^{-2}$ mmole) bovine serum albumin (BSA) in 150 ml. distilled water is added sufficient sodium carbonate to maintain a pH 10–11, followed by the addition of 2-bromomethylene-4,4,5,5-tetramethylimidazolin-3-oxide - 1 - oxyl (0.10 g., $4.2 \times 10^{-1}$ mmole). The reaction mixture is then stirred in the dark at 25° C. for 24 hours, after which it is dialyzed at room temperature against water for two days. The water should be changed four times during the first 24 hours and twice during the remaining 24 hours. The residue is then lyophylized to dryness yielding spin labeled BSA as a nearly colorless solid. The ESR spectrum of the spin labeled BSA will give a broad 5-line pattern ($H_2O$, pH 7.0) characteristics of an immobilzed α-nitronylnitroxide radical.

To demonstrate the inhibition of a free radical polymerization reaction, the following experiment was carried out:

Two 1 ml. samples of freshly distilled styrene containing 0.25 mg. of benzoyl peroxide were prepared. To one sample was added 0.1 weight percent of 2-phenyl-4,4,5,5-tetramethylimidazoline-3-oxide-1-oxyl. Each sample was added to a closed-off glass tube having approximately a 5 mm. inside diameter and containing a 3 mm. steel ball bearing. The samples were heated at 59° C. over a period of 71 hours in air. Periodically the balls were raised to the surface of the liquid with a magnet and the time required for the ball to drop recorded. Initially, the time in seconds for the ball to drop was approximately 0.1 second. By 56 hours, the sample with the radical inhibitor had substantially the same time for fall as the initial time, while the control sample required 67 seconds. At 71 hours, while the inhibited sample still showed substantially the same time for fall as initially, the sample without inhibitor required an immeasurably long time for the ball to fall. This means, the viscosity of the styrene sample had become so great that the ball now could hardly move through the solution. This is clear evidence, of the excellent inhibitory effect of the nitroxide free radical, in inhibiting a polymerization reaction, even in the presence of a peroxide catalyst.

Numerous other uses can also be found for the novel compounds of this invention because of the extreme versatility in their structure, ease of preparation, and their stability. The compounds can be used for metering oxidation reactions and reduction reactions by following the formation or destruction of the nitroxide free radical. In addition, other reactions may also be followed, where the change in reaction results in a change in the spectrum of the nitroxide radical, such as pH determinations.

The α-nitronylnitrone (VI) can be used in a wide variety of oxidations, the compound can liberate free halogen from iodide or bromide in solution, so as to detect the presence of such anions. Also, the compound can produce hydrogen peroxide in mild alkali solutions, so as to provide an in situ source of hydrogen peroxide. The compound can also be used as a mild oxidizing agent to oxidize aldehydes to carboxylic acids and dihydropyridazine to pyridazine. Also, the compound can be used in the oxidation of tetrachlorohydroquinone to chloranil.

While one embodiment of the invention has been shown and described, it will be obvious that other adaptations and modifications can be made without departing from the true spirit and scope of the invention.

What is claimed is:

1. Diazole of the formula:

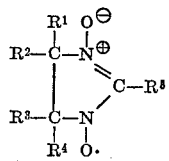

wherein:
each of $R^{1-4}$ is a hydrocarbon group of from 1 to 12 carbon atoms, $R^{1-2}$ and $R^{3-4}$ may be taken together to form a divalent hydrocarbon radical of from 3 to 10 carbon atoms, $R^1$ and $R^3$ may be taken together to form a divalent hydrocarbon radical of from 3 to 10 carbon atoms, and $R^5$ is hydrogen or an organic radical of from 1 to 60 carbon atoms.

2. Diazole according to claim 1, wherein $R^5$ is of from 1 to 30 carbon atoms, and from 0 to 10 heteroatoms.

3. Diazole of the formula:

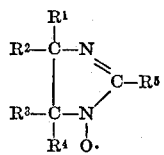

wherein:
each of $R^{1-4}$ is a hydrocarbon group of from 1 to 12 carbon atoms, two of which may be taken together to form a divalent radical which forms a ring with the carbon atom or atoms to which they are attached; and
$R^5$ is hydrogen, or an organic radical of from 1 to 60 carbon atoms.

4. Diazole according to claim 3, wherein $R^5$ is an organic radical of from 1 to 30 carbon atoms, and from 0 to 10 heteroatoms.

5. Diazole of the formula:

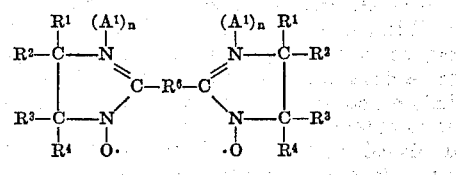

wherein:
n is 0 to 1, the nitrogen to which $A^1$ is attached being positive when n is 1, $A^1$ is oxygen, $R^{1-4}$ are hydrocarbon of from 1 to 12 carbon atoms, two of which may be taken together to form a divalent hydrocarbon radical of from 3 to 10 carbon atoms, which forms a ring with the carbon atom or atoms to which they are attached, and $R^6$ is a bond or divalent radical of from 1 to 12 carbon atoms, and 0 to 7 heteroatoms.

6. Diazole of the formulae:

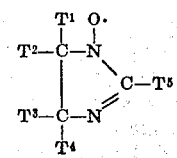

or

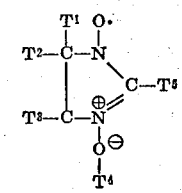

wherein:
$T^{1-4}$ are hydrocarbon of from 1 to 12 carbon atoms, having from 0 to 1 site of aliphatic unsaturation, two of which may be taken together to form a divalent hydrocarbon radical of from 3 to 10 carbon atoms which forms a ring with the carbon atom or atoms to which they are attached, the total number of carbon atoms for $T^{1-4}$ being in the range of from 4 to 28, and $T^5$ is hydrogen or a monovalent organic radical of from 1 to 30 carbon atoms, and from 0 to 10 heteroatoms having 0 to 6 oxygen atoms, 0 to 6 nitrogen atoms, and 0 to 3 other heteroatoms.

7. Diazole according to claim 6, wherein $T^{1-4}$ are alkyl of from 1 to 3 carbon atoms.

8. Diazole according to claim 7, wherein said heteroatoms are present as oxy, thiooxy, oxo carbonyl, non-oxo carbonyl, amino, and inorganic acids, esters and salts.

9. Diazole according to claim 6, wherein $T^{1-4}$ are alkyl of from 1 to 3 carbon atoms, and $T^5$ is hydrogen.

10. Diazole according to claim 6, wherein $T^{1-4}$ are alkyl of from 1 to 3 carbon atoms, and $T^5$ is aryl hydrocarbon.

11. Diazole according to claim 6, wherein $T^{1-4}$ are alkyl of from 1 to 3 carbon atoms, and $T^5$ is alkoxy carbonyl.

12. Diazole according to claim 6, wherein $T^{1-4}$ are alkyl of from 1 to 3 carbon atoms, and $T^5$ is hydroxy or halomethyl.

13. Diazole according to claim 6, wherein $T^{1-4}$ are alkyl of from 1 to 3 carbon atoms, and $T^5$ is at least one heteroatom functionality having an amino group, an ammonium group, a carboxylic acid group of a phosphate ester group.

14. Diazole according to claim 6, wherein $T^{1-4}$ are alkyl of from 1 to 3 carbon atoms and $T^5$ has a heterocyclic ring having from 1 to 3 heteroannular members.

15. Diazole of the formula:

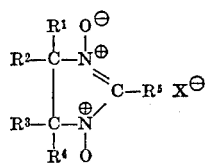

wherein:
$R^{1-4}$ are hydrocarbon of from 1 to 12 carbon atoms, two of which may be taken together to form a divalent hydrocarbon radical of from 3 to 10 carbon atoms which forms a ring with a carbon atom or atoms to which they are attached, and $R^5$ is an organic radical of from 1 to 30 carbon atoms, and from 0 to 10 heteroatoms.

References Cited

Osiecki et al, J. Am. Chem. Soc. vol. 90, p. 1078 to 1079 (Feb. 14, 1968).

Volodarsky et al., Tetrahedron Letters, No. 21, pp. 1565 to 1568 (1965).

JOHN D. RANDOLPH, Primary Examiner

U.S. Cl. X.R.

23—230 B; 230 M; 252—401, 402, 403; 260—75 R, 77.5R, 78 R, 112 R, 143, 157, 210 R, 250, 257, 267, 296 R, 309.7, 571, 584 R, 644, 645